United States Patent [19]

Ohmae et al.

[11] Patent Number: 4,624,404

[45] Date of Patent: Nov. 25, 1986

[54] METHOD FOR BONDING CERAMICS AND METALS

[75] Inventors: Takashi Ohmae; Yasuhiro Fukaya; Shozo Hirai, all of Kanonshin, Japan

[73] Assignee: Mitsubishi Jukogyo Kabushiki Kaisha, Japan

[21] Appl. No.: 681,020

[22] Filed: Dec. 13, 1984

[30] Foreign Application Priority Data

Dec. 19, 1983 [JP] Japan ................................. 58-237986

[51] Int. Cl.$^4$ ............................................ H01L 23/02
[52] U.S. Cl. .................................... 228/198; 228/122; 228/188
[58] Field of Search ............... 228/121, 122, 124, 193, 228/194, 198, 263.12, 188; 427/423, 34

[56] References Cited

U.S. PATENT DOCUMENTS

| | | | |
|---|---|---|---|
| 2,857,663 | 10/1958 | Beggs | 228/238 |
| 3,226,822 | 1/1966 | Budde et al. | 228/122 |
| 3,324,543 | 6/1967 | McVey et al. | 228/122 |
| 3,813,759 | 6/1974 | Heap et al. | 228/121 |
| 4,452,389 | 6/1984 | Amin | 228/193 |

FOREIGN PATENT DOCUMENTS

| | | | |
|---|---|---|---|
| 755771 | 8/1980 | Japan | 228/122 |
| 95670 | 6/1983 | Japan | 228/263.12 |
| 95671 | 6/1983 | Japan | 228/121 |
| 137379 | 8/1984 | Japan | 228/263.12 |
| 218263 | 12/1984 | Japan | 228/263.17 |

Primary Examiner—M. Jordan
Attorney, Agent, or Firm—Toren, McGeady, Stanger, Goldberg & Kiel

[57] ABSTRACT

A method for bonding $Si_3N_4$ or SiC ceramics with metals which comprises the steps of depositing, on the ceramic material, an insert material consisting of a mixture of at least one metal selected from the group consisting of Ni and Cu and at least one member selected from the group consisting of metal oxides, nitrides and carbides by ion plating or spary coating, subjecting the deposited insert material to thermal reaction treatment to permit metallurgical bond between the insert material and the ceramic material, and bonding a metal member to the surface of the insert material by brazing with a brazing material whose melting point is lower than the insert material or by diffusion welding at a temperature lower than a melting point of the insert material.

6 Claims, 3 Drawing Figures

METHOD FOR BONDING CERAMICS AND METALS

BACKGROUND OF THE INVENTION

1. Field of the Invention

This invention relates to the art of bonding between ceramics and metals and more particularly, to a method for bonding ceramics and metals while preventing crackings of the ceramics.

2. Description of the Prior Art

Broadly, known methods of bonding ceramics and metals together include (1) an adhesive method, (2) a metallizing method and (3) a spray coating method. However, these methods have the following drawbacks.

(1) The adhesive method is the simplest method but adhesion strength at high temperatures is low.

(2) The metallizing method is a method which comprises placing an Mo metallic powder such as Mo, Mo-Mn or the like on ceramics, heating the powder for metallizing in a moistening atmosphere, subjecting the metallized layer to Ni plating, and bonding a metal to the ceramic by brazing. However, this method is disadvantageous in difficulty of application depending on the type of ceramic. In addition, because of the high metallizing temperature, great thermal stress is exerted on the ceramic upon cooling, with the unfavorable tendency toward cracking.

(3) The spray coating method is a method in which ceramic powder is fused and adhered to metals by spraying. The method is also disadvantageous in that the bonding strength is low and the sprayed ceramic becomes porous.

As will be seen from the above, the prior art methods have such drawbacks that the bonding strength is not adequate, ceramics are liable to crack, and limitation is placed on the type of ceramic being applied.

SUMMARY OF THE INVENTION

The present invention is accomplished to overcomes the above drawbacks.

According to one embodiment of the invention, there is provided a method for bonding $Si_3N_4$ or SiC ceramics and metals which comprises the steps of depositing, on the ceramic material, an insert material consisting of a mixture of at least one metal selected from the group consisting of Ni and Cu and at least one metal compound selected from the group consisting of metal oxides, nitrides and carbides by ion plating or spray coating, subjecting the deposited insert material to thermal reaction-promoting treatment to permit strong metallurgical bond between the insert material and the ceramic material, and soldering a metal member and the surface of the insert material with a soldering material having a melting point lower than a melting point of the insert material.

According to another embodiment of the invention, there is also provided a method for bonding $Si_3N_4$ or SiC ceramics and metals which comprises the steps of depositing, on the ceramic material, an insert material consisting of a mixture of at least one metal selected from the group consisting of Ni and Cu and at least one metal compound selected from the group consisting of metal oxides, nitrides and carbides by ion plating or spray coating, subjecting the deposited insert material to thermal reaction-promoting treatment to permit strong metallurgical bond between the insert material and the ceramic material, and brazing a metal member and the surface of the insert material by diffusion welding at a temperature lower than a melting point of the insert material.

The insert materials used in the practice of the invention include composite materials of Ni and metal oxides such as NiO, $Al_2O_3$, $ZrO_2$ and the like, metal nitrides such as TiN, $Si_3N_4$ and the like, or metal carbides such as TiC, WC, SiC and the like, or mixtures of Cu and metal oxides such as $Cu_2O$, $Al_2O_3$, $ZrO_2$ and the like, metal nitrides such as TiN, $Si_3N_4$ and the like, or metal carbides such as TiC, WC, SiC and the like.

In accordance with the method of the invention, prior to bonding or welding of $Si_3N_4$ or SiC ceramics and metals, the composite insert material is deposited on the ceramic by ion plating or spray coating. Thereafter, strong bonding is ensured by the thermal reaction-promoting treatment or processing. Finally, the insert material and the metal are completely bonded by brazing with a low melting brazing material or by diffusion welding at temperatures lower than a melting point of the insert material used. The method of the invention ensures not only flat lap joint bonding between ceramics and metals, but also sleeve joint bonding, bonding of ceramics to inner and outer surfaces of metallic cylinders and bondings of ceramics and metals along complicated configurations without involving crackings of the ceramics but with high bonding strength.

Objects, advantages and features of the present invention will become apparent from the following detailed description with reference to the accompanying drawing.

DETAILED DESCRIPTION OF THE INVENTION

Figure 1A:
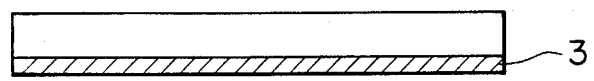
FIGS. 1(A) through 1(C) are a schematic view illustrating the steps of a method embodying the present invention.
Figure 1B:
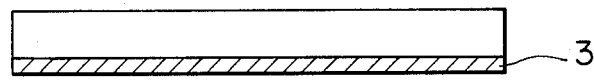
Figure 1C:
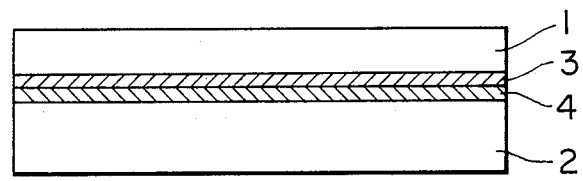

Reference is now made to the drawing and particularly to FIGS. 1(A) through 1(C). In the figures, reference numeral 1 indicates an $Si_3N_4$ or SiC ceramic and reference numeral 2 indicates a metal being bonded to the ceramic. Reference numeral 3 designates a composite insert material made, for example, of NiO+Ni or $Cu_2O$+Cu (comprising over 5% of a metal constituent) and reference numeral 4 indicates a soldering material whose melting point is lower than a melting point of the insert material 3. Brazing or soldering material is, for example, solder, Al, Ag, Cu, Ni and the like solders.

In FIG. 1(A), the composite insert material 3 is deposited on the ceramic 1 by ion plating or spray coating to obtain a sub-assembly. Subsequently, the sub-assembly is subjected to thermal reaction-promoting treatment or processing in FIG. 1(B), followed by brazing the metal 2 being bonded in FIG. 1(C).

The ion-plating of FIG. 1(A) is carried out as follows.

(1) Insert materials of oxides+Ni (or Cu)

(1)-1 With oxides of Ni (or Cu)

(First Method) Ni or Cu is placed in a crucible, melted and evaporated to effect the ion plating. In this connection, it should be noted that the atmosphere for the ion-plating is alternately changed between vacuum and oxygen atmospheres. As a principle, an initial layer and a final layer are formed in vacuo. More particularly, Ni (or Cu) is obtained in vacuo and Ni or Cu is oxidized into NiO or Cu$_2$O in an atmosphere of oxygen, by which a composite insert material of a laminate structure of NiO+Ni (or Cu$_2$O+Cu) is deposited on the ceramic.

(Second Method) Ni or Cu is placed in a crucible, melted and evaporated for ion plating. In this connection, the ion plating is effected by a procedure which comprises, after evacuation, feeding a predetermined amount of oxygen into a chamber in order to oxidize part of the metal heated and evaporated. As a result, a composite insert material having a predetermined ratio of NiO+Ni (or Cu$_2$O+Cu) is deposited on the ceramic.

(1)-2 With the case where oxides other than NiO and Cu$_2$O are used (Al$_2$O$_3$, ZrO$_2$ and the like).

Two crucible are provided. A metal (Al, Zr or the like) which is converted into a corresponding oxide is placed in one crucible and Ni or Cu is placed in the other crucible. The metals in the individual crucibles are melted and evaporated for the ion plating. The ion plating atmosphere should be alternately changed between high vacuum and oxygen atmospheres. As a principle, initial and final layers should be effected in vacuo. Ni is evaporated in vacuo and the other metal such as Al, Zr or the like is evaporated in an oxygen atmosphere where it is oxidized into Al$_2$O$_3$, ZrO$_2$ or the like. As a result, a composite insert material of the laminate structure such as, for example, of Al$_2$O$_3$+Ni, Al$_2$O$_3$+Cu, ZrO$_2$+Ni, ZrO$_2$+Cu or the like is deposited on the ceramic.

(2) Insert Materials of Nitrides and Ni or Cu (First Method) An alloy of a metal capable of constituting nitride (Si, Ti or the like) and Ni or Cu (e.g. Ni-Si alloy, Cu-Si alloy, Ni-Ti alloy, Cu-Ti alloy or the like) is placed in a crucible which is subsequently evacuated to a vacuum. Thereafter, nitrogen gas is introduced into a reaction chamber where the alloy is heated and evaporated. For instance, with Ni-Si alloy, the evaporated Si which has very high affinity for nitrogen is converted into Si$_3$N$_4$. On the other hand, Ni is not nitrided and is deposited on the ceramic as it is. Thus, Si$_3$N$_4$+Ni are deposited on the ceramic.

Likewise, with Cu-Si alloy, Si is nitrided but Cu is not nitrided, so that Si$_3$N$_4$+Cu are deposited on the ceramic.

With Ni-Ti alloy, evaporate Ti has very high affinity for nitrogen and is converted into TiN, but Ni is not nitrided, so that TiN+Ni are deposited on the ceramic.

With Cu-Ti alloy, Ti is nitrided but no nitriding of Cu takes place. TiN+Cu are deposited on the ceramic.

(Second Method) Two crucible are provided in order that a metal capable of converting into nitride (e.g. Si, Ti or the like) is placed in one crucible and Ni or Cu is placed in the other crucible. The respective metals are fused and evaporated while alternately changing the atmosphere from a high vacuum atmosphere to a nitrogen gas atmosphere. As a principle, initial and final layers are formed under vacuum. Ni or Cu is ion-plated in a high vacuum atmosphere and Si, Ti or the like is ion-plated in a nitrogen atmosphere. As a result, composite insert materials having laminate structures such as, for example, of Si$_3$N$_4$+Ni, Si$_3$N$_4$+Cu, TiN+Ni, TiN+Cu and the like are deposited on the ceramic.

(3) Insert Materials of Carbides+Ni or Cu (First Method) Alloys (Ni-Si alloy, Cu-Si alloy, Ni-W alloy, Cu-W alloy and the like) of metals capable of converting into carbides (Si, W and the like) and Ni or Cu are placed in a crucible and after evacuation, a predetermined amount of acetylene gas is charged into a reaction chamber, followed by heating and evaporating.

With Ni-Si alloy, evaporated Si has very high affinity for C decomposed from acetylene and is converted into SiC, but no carbonization of Ni takes place. Thus, Ni is deposited on the ceramic as it is and SiC+Ni is formed on the ceramic.

With Ni-W alloy, evaporated W has very high affinity for C and is converted into WC but no carbonization of Ni takes place. Thus, WC+Ni are deposited on the ceramic.

With Cu-W alloy, W is carbonized but Cu is not carbonized, so that WC+CU are deposited on the ceramic.

(Second method) Two crucibles are provided and a metal (Si, W or the like) capable of forming a corresponding carbide is placed in one crucible. Ni or Cu is placed in the other crucible. While the atmosphere is changed between high vacuum and acetylene gas atmospheres, the metals are melted and evaporated. As a principle, initial and final layers are formed in vacuo. More particularly, Ni or Cu is ion-plated in vacuo and Si, W or the like is ion-plated in an atmosphere of acetylene gas, thereby depositing, on the ceramic, a composite insert material of a laminate structure such as SiC+N, SiC+Cu, WC+Ni, WC+Cu or the like.

In case where composite insert materials are spray coated, it may be sufficient to merely change a combination in mixture of the above-indicated powders. The spray coating method used is generally a plasma spray coating technique. The melting point of the composite insert material obtained by the ion plating, spray coating and the like is determined as the lowest melting point among melting points of oxides, nitrides, carbides, Ni and Cu. If an eutectic reaction proceeds, the eutectic point should be taken into account and the lowest temperature is taken as a melting point of a composite insert material.

The thermal reaction-promoting treatment as in FIG. 1(B) is carried out in order to increase the bonding strength between the ion-plated or spray-coated composite insert material and the ceramic. This treatment is effected by heating at a temperature over $\frac{1}{3}$ times a melting point of the composite insert material (the upper limit is the melting of the composite insert material) in an inert gas or in vacuo for a time over 5 minutes. With regard to the melting point of the insert material, NiO+Ni insert material is determined to have a melting point of 1438° C. because Ni has a melting point of 1453° C., NiO has a melting point of 1957° C. and the eutectic mixture of NiO and Ni has a melting point of 1438° C. Likewise, Cu$_2$O+Cu insert material is determined to have a melting point of 1065 because Cu has a melting point of 1083° C., Cu$_2$O has a melting point of 1230° C. and the eutectic mixture of Cu$_2$O+Cu has a melting point of 1065° C. A hot hydrostatic pressure treatment (hereinafter referred to simply as HIP treatment) may be used, in which a load of a Ar or the like gas pressure over 0.01 kg/mm$^2$ is used under such time and temperature conditions as used above.

The reason why the temperature used is over $\frac{1}{3}$ times the melting point of the insert material is due to the fact that at lower temperatures, the bonding reaction between the composite insert material and the ceramic proceeds only very slowly with a need of a long operation time, thus being unfavorable from the industrial point of view. On the other hand, the upper limit of the temperature is determined to be lower than the melting point of the composite insert material because higher temperatures result in melting and flowing-out of the insert material. The reason why the treating time is over 5 minutes is owing to the fact that when the time is less than 5 minutes, bonding between the composite insert material and the ceramic becomes insufficient.

In the brazing in FIG. 1(C), a brazing material which has a melting point lower than a melting point of an insert material is used for brazing the insert material and a metal being bonded. The reason why a low melting brazing material is used is due to the fact that thermal stress which will be produced according to the difference in thermal expansion coefficient between the ceramic 1 and the bonding metal 2 at the time of brazing is decreased in order to prevent crackings of the ceramic.

As described before, the content of the metal component in the composite insert material is defined to be not less than 5 wt%. This is because when the content is less, the metal constituent is so small that the ability of bonding with a metal lowers and the ductility of the insert material itself is lost, so that the insert material is liable to crack.

The effects, advantages and features of the method of the invention are summarized below.

(1) Because of the difference in structure between $Si_3O_4$ or SiC and metals, i.e. $Si_3O_4$ and SiC are combined with covalent bonds and metals are based on metallic bonds, the bonding between them is very difficult. Another problem is that because of the poor toughness of $Si_3N_4$ or SiC, these ceramics tend to crack due to the thermal stress produced during the bonding even when the ceramic and metal are bonded together.

In the practice of the invention, so-called cermets of oxides+metals, e.g. NiO+Ni or $Cu_2O$+Cu, are used as the insert material. This leads to the following advantages.

1. Ni or Cu which is a metal component in the composite insert material exhibits good metallurgical bonding with $Si_3N_4$ or SiC and thus good joints can be obtained. Because $Si_3N_4$ or SiC contains free Si therein (including free Si which is obtained by heating $Si_3N_4$ over 1000° C. at which part of the ceramic starts to decompose thereby producing Si), the Si and Ni or Cu diffuse with each other when heated at high temperatures. At the same time, Si is dissolved in Ni and Cu to form a solid solution (the degree of solid solution of Si in Ni or Cu is about 5 wt% at normal temperatures), and thus good joints are obtained without forming any brittle layer.

2. Ni or Cu and the bonding metal 2 are all metals, which have fundamentally good weldability, ensuring good joints.

3. Assuming that Ni or Cu alone is used as an insert material and ion-plating or spray coating is effected on $Si_3N_4$ or SiC, followed by thermal reaction-promoting treatment in the subsequent step (step of FIG. 1(B)), great thermal stress is produced, during cooling, due to the difference in thermal expansion coefficient between $Si_3N_4$ or SiC and Ni or Cu. This leads to a high possibility of producing cracks in $Si_3N_4$ or SiC, needing an exact operation control for preventing formation of the cracks. In contrast, in the practice of the invention, NiO or $Cu_2O$ is added to Ni or Cu to form a cermet which has a smaller thermal expansion coefficient, thus causing the produced thermal stress to lower. Cracking of $Si_3O_4$ or SiC can be prevented.

The thermal expansion coefficients of $Si_3O_4$, SiC, Ni and Cu are as follows.
$Si_3N_4$, SiC: about $3-4 \times 10^{-6}$/°C.
Ni: about $13 \times 10^{-6}$/°C.
Cu: about $17 \times 10^{-6}$/°C.

4. As compared with the case where Ni or Cu alone is used as an insert material, the insert material of the invention to which high strength NiO or $Cu_2O$ is added to form a cermet is higher in strength with an increase of joint strength.

5. Oxides (NiO, $Cu_2O$ and the like) in the composite insert materials are the same oxides as $SiO_2$ contained in $Si_3O_4$ or SiC ceramics in small amounts, MgO, $Al_2O_3$ or $Y_2O_3$ used as a sintering aid for $Si_3O_4$ and $Al_2O_3$ or BeO used as sintering aid for SiC. These oxides have such a crystal structure mainly made of ion bonds, so that when the composite insert material and the ceramic are heated at high temperatures, reactions take place and contribute to the bonding.

(2) In the practice of the invention, a composite insert material is first deposited on a ceramic by ion plating or spray coating. The ion plating or spray coating is used, so that no matter how the ceramic is complicated in shape, the insert material can be conveniently deposited (this is difficult with foils).

(3) According to the invention, the thermal reaction-promoting treatment (including a heat treatment and HIP treatment described before) is followed with the following advantages and effects.

1. Si in $Si_3N_4$ or SiC and Ni or Cu in the insert material are sufficiently diffused when heated at high temperatures, resulting in a satisfactory metallurgical bonding or joint. With the HIP treatment, fine voids of the insert material at the interface with the ceramic (i.e. fine voids formed at the time of the ion plating or spray coating disappear by creep and plastic deformations caused by application of the pressure load, enhancing the bonding force.

2. No matter how the shape of ceramics is complicated, this treatment is possible and thus the insert material can be strongly bonded to the oxide ceramics according to the metallurgical diffusion reaction.

Especially, the HIP treatment is advantageous in that because a pressure of a hot gas is uniformly, three-dimensionally applied, the operation is possible even when the shape of the ceramic is very complicated, ensuring good bonding between the insert material and the ceramic. The pressure is applied three-dimensionally with a further advantage that there is little fear of producing cracks of the ceramic.

(4) The sub-assembly of the insert material and the bonded metal which has undergone the thermal reaction-promoting treatment is subjected to brazing with a brazing material having a melting point lower than a melting point of the insert material used, thereby completing the bonding. These steps have the following effects.

1. In general, the ceramic 1 and the bonding metal 2 have a substantial difference in thermal expansion coefficient, so that the ceramic is apt to crack by the thermal stress produced during the cooling operation after bonding. In the practice of the invention, low melting brazing materials are used, so that a cooling temperature range decreases with a lowering of produced thermal stress, showing a remarkable effect of preventing cracking of the ceramic.

2. As a matter of course, metal components in the insert material and a bonding metal are metals which can be fundamentally welded very easily. Accordingly, such brazing materials as used before are used to form good joints.

In the practice of the invention, there are used, instead of NiO and $Cu_2O$ oxides in the composite insert materials of NiO+Ni and $Cu_2O$+Cu, other metal oxides such as $Al_2O_3$, $ZrO_2$ and the like, metal nitrides such as TiN, $Si_3N_4$ and the like, and metal carbides such as TiC, WC, SiC and the like.

In this connection, when ion plating is used, the number of crucibles may be increased as desired. Oxygen gas is used for metal oxides and nitrogen gas is used for metal nitrides, followed by repeating the procedure described before. For instance, with the composite insert material of Ni+TiN, two crucible for Ni and Ti are used. When Ni is subjected to ion plating in vacuo and Ti is subjected to ion plating in a nitrogen atmosphere alternately, the composite insert material of Ni+TiN is ion-plated. On the other hand, with spray coating, it will be sufficient to merely change a combination in mixing of powders. The melting point of an insert material is determined as the lowest melting point of an oxide, nitride or carbide and Ni or Cu. If an eutectic mixture exists, the melting point thereof should be taken into account in order to determine the lowest melting point.

The nitrides in the composite insert material are the same nitrides as $Si_3N_4$ ceramic and the carbides are the same carbide as SiC ceramic, with almost the same crystal structure. When heated at high temperatures, the composite insert material and the ceramic undergo the diffusion reaction, contributing to the bonding therebetween.

According to the method of the invention, brazing between the insert material and the bonding metal may be replaced by diffusion welding. Similar to the brazing, diffusion welding is effected at temperatures lower than a melting point of an insert material used so that thermal stress produced in the ceramic is reduced to prevent cracking of the ceramic. The diffusion welding is carried out under ordinary conditions including a pressure of 0.1-5 $kg/mm^2$ and a time of 5 minutes to 5 hours. Good results are obtained because the metal component (Ni or Cu) in the insert material and a bonding metal are both metals.

The present invention is more particularly described by way of examples.

EXAMPLE 1

$Si_3N_4$ in the form of a 2 mm thick sheet was ion-plated on the surface thereof with a 20 μm thick layer of NiO+Ni (50% Ni and 50% NiO on the weight basis) and subjected to thermal reaction treatment in vacuo at a temperature of 1200° C. for 30 minutes. Subsequently, a 3 mm thick SS 41 sheet which was used as a bonding metal was placed on the NiO+Ni layer and subjected to brazing with Ag at a temperature of 850° C. for a time of 10 minutes.

As a result, a good joint was obtained without involving any cracks in the $Si_3N_4$ and the joint was free of non-bonded portions over the entire bonded surface.

EXAMPLE 2

SiC in the form of a 2 mm thick sheet was provided, on which $Cu_2O$+Cu (70% Cu, 30% $Cu_2O$ on the weight basis) were subjected to plasma spray coating in a thickness of 100 μm and also to thermal reaction treatment in an atmosphere of Ar under conditions of a temperature of 1030° C. and a treating time of 30 minutes.

Thereafter, a 5 mm thick Kovar plate which was a bonding metal was placed on the $Cu_2O$+Cu layer and subjected to brazing with Ag under conditions of a temperature of 850° C. and a time of 10 minutes.

As a result, there was obtained a good joint involving no cracks in the SiC and free of non-bonded portions over the entire bonded surface.

EXAMPLE 3

A round rod of $Si_3N_4$ having a diameter of 10 mm and a length of 20 mm was provided and ion-plated on the outer surface thereof with NiO+Ni (90% Ni, 10% NiO on the weight basis) in a thickness of 30 μm, followed by the HIP treatment in an atmosphere of Ar under conditions of a temperature of 1100° C., an Ar gas pressure of 15 $kg/mm^2$ and a treating time of 30 minutes.

Subsequently, a Kovar hollow cylinder used as a metal being bonded and having an inner diameter of 10.25 mm, an outer diameter of 16.25 mm and a length of 20 mm was provided, into which the $Al_2O_3$ round rod applied with an Ag brazing paste was inserted, followed by brazing at a temperature of 850° C. in an atmosphere of Ar for a time of 10 minutes.

As a result, there was obtained a good joint involving no cracks in the $Si_3N_4$ and free of any non-bonded portions over the entire bonded surface of the cylinder.

EXAMPLE 4

A cylinder of SiC having an inner diameter of 20 mm, an outer diameter of 25 mm and a length of 50 mm was provided and ion-plated on the outer surface thereof with $Al_2O_3$+Ni (80% Ni, 20% $Al_2O_3$ on the weight basis) in a thickness of 20 μm, followed by the HIP treatment in an atmosphere of Ar under conditions of a temperature of 1100° C., an Ar gas pressure of 10 $kg/mm^2$ and a treating time of 15 minutes.

The SiC cylinder onto which an Sn-Pb solder was applied was inserted inserted into an Al cylinder used as a bonding metal and having an inner diameter of 25.25 mm, an outer diameter of 45.25 mm and a length of 50 mm, followed by brazing at a temperature of 250° C. for 3 minutes.

As a result, there was obtained a good joint involving no cracks in the SiC and free of any non-bonded portions over the entire bonded surface of the cylinder.

EXAMPLE 5

$Si_3N_4$ in the form of a 2 mm thick sheet was provided, on which NiO+Ni (80% Ni, 20% NiO on the weight basis) were ion-plated in a thickness of 20 μm, followed by thermal reaction-promoting treatment in vacuo under conditions of a temperature of 1150° C. and a treating time of 60 minutes.

Subsequently, a 3 mm thick Kovar sheet which was used as a bonding metal was placed in face-to-face relation with the NiO+Ni surface, followed by diffusion welding in vacuo under conditions of a temperature of 900° C., a pressure of 2 $kg/mm^2$ and a time of 1 hour.

As a result, there was obtained a good joint involving no cracks in the $Si_3N_4$ and free of non-bonded portions over the entire surface of the joint.

EXAMPLE 6

$Si_3N_4$+Ni (30% $Si_3N_4$, 70% Ni on the weight basis) were ion-plated on a 2 mm thick $Si_3N_4$ sheet in a thickness of 30 μm, followed by thermal reaction treatment in vacuo under conditions of a temperature of 1200° C., and a treating time of 15 minutes.

Thereafter, a 4 mm thick SS 41 plate used as a metal being bonded was placed in face-to-face relation with the $Si_3N_4+Ni$ surface, followed by diffusion welding in vacuo under conditions of a temperature of 1000° C., a pressure of 0.3 kg/mm² and a time of 1 hour.

As a result, there was obtained a good joint involving no cracks in the $Si_3N_4$ and free of non-bonded portions over the entire joint surface.

EXAMPLE 7

SiC was provided as a 2 mm thick sheet and plasma spray-coated with SiC+Ni (40% SiC, 60% Ni on the weight basis) in a thickness of 100 μm, followed by thermal reaction treatment in vacuo under conditions of a temperature of 1100° C. and a time of 30 minutes.

Subsequently, a 5 mm thick Kovar plate used as a metal being bonded was facing with the SiC+Ni surface, followed by diffusion welding in vacuo under conditions of a temperature of 1000° C., a pressure of 0.5 kg/mm² and a time of 1 hour.

As a result, there was obtained a good joint involving no cracks in the SiC and free of non-bonded portions over the entire surface.

What is claimed is:

1. A method for bonding $Si_3N_4$ or SiC ceramics and metals which comprises the steps of depositing, on the ceramic material, an insert material consisting of a mixture of at least one metal selected from the group consisting of Ni and Cu and at least one metal compound selected from the group consisting of metal oxides, nitrides and carbides by ion plating or spray coating, subjecting the deposited insert material to thermal reaction-promoting treatment to permit strong metallurgical bond between the insert material and the ceramic material, and brazing a metal member and the surface of the insert material with a brazing material having a melting point lower than a melting point of the insert material.

2. The method according to claim 1, wherein said insert material is a composite material made of Ni and a member selected from the group consisting of NiO, $Al_2O_3$, $ZrO_2$, TiN, $Si_3N_4$, TiC, WC, SiC.

3. The method according to claim 1, wherein said insert material is a composite material made of Cu and a member selected from the group consisting of $Cu_2O$, $Al_2O_3$, $ZrO_2$, TiN, $S_3N_4$, TiC, WC, and SiC.

4. A method for bonding $Si_3N_4$ or SiC ceramics and metals which comprises the steps of depositing, on the ceramic material, an insert material consisting of a mixture of at least one metal selected from the group consisting of Ni and Cu and at least one metal compound selected from the group consisting of metal oxides, nitrides and carbides by ion plating or spray coating, subjecting the deposited insert material to thermal reaction-promoting treatment to permit strong metallurgical bond between the insert material and the ceramic material, and brazing a metal member and the surface of the insert material by diffusion welding at a temperature lower than a melting point of the insert material.

5. The method according to claim 4, wherein said insert material is a composite material made of Ni and a member selected from the group consisting of NiO, $Al_2O_3$, $ZrO_2$, TiN, $Si_3N_4$, TiC, WC, SiC.

6. The method according to claim 4, wherein said insert material is a composite material made of Cu and a member selected from the group consisting of $Cu_2O$, $Al_2O_3$, $ZrO_2$, TiN, $S_3N_4$, TiC, WC, and SiC.

* * * * *